United States Patent [19]

Takimura et al.

[11] Patent Number: 4,738,152
[45] Date of Patent: Apr. 19, 1988

[54] POWER TRANSMISSION FOR AUTOMOTIVE VEHICLE

[75] Inventors: Keisuke Takimura; Nobuaki Katayama; Kan Sasaki; Kinya Yoshii, all of Toyota, Japan

[73] Assignee: Toyota Jidosha Kabushiki Kaisha, Toyota, Japan

[21] Appl. No.: 863,518

[22] Filed: May 15, 1986

[30] Foreign Application Priority Data

May 15, 1985 [JP] Japan .............................. 60-72130[U]
May 15, 1985 [JP] Japan .............................. 60-72131[U]

[51] Int. Cl.$^4$ ....................... F16H 57/04; F16H 57/02
[52] U.S. Cl. ........................................ 74/467; 74/701;
74/606 R; 180/247
[58] Field of Search ................. 74/701, 467, 713, 740;
180/246, 247, 606 R

[56] References Cited

U.S. PATENT DOCUMENTS

| 2,807,340 | 9/1957 | Butterworth | 74/701 X |
| 3,246,542 | 4/1966 | Moan | 74/740 |
| 4,015,483 | 4/1977 | Warner | 74/230 |
| 4,222,283 | 9/1980 | Nagy | 74/467 |
| 4,242,923 | 1/1981 | Nishikawa et al. | 74/467 X |
| 4,352,301 | 10/1982 | Fleury | 74/713 X |
| 4,355,542 | 10/1982 | Tsutsumi et al. | 74/467 |
| 4,416,168 | 11/1983 | Arai | 74/740 |
| 4,431,079 | 2/1984 | Suzuki | 180/247 X |
| 4,476,953 | 10/1984 | Hiraiwa | 180/247 X |
| 4,501,167 | 2/1985 | Saito | 74/467 |
| 4,537,092 | 8/1985 | Morisawa | 74/740 X |
| 4,602,526 | 7/1986 | Ashikawa | 74/701 |

FOREIGN PATENT DOCUMENTS

| 1959585 | 7/1978 | Fed. Rep. of Germany | 74/467 |
| 2522874 | 1/1979 | Fed. Rep. of Germany | . |
| 2922813 | 2/1983 | Fed. Rep. of Germany | . |
| 7824159 | 5/1979 | France | . |
| 7824160 | 11/1979 | France | . |
| 176120 | 5/1984 | Japan | . |
| 1547022 | 6/1979 | United Kingdom | 74/606 R |
| 979766 | 12/1982 | U.S.S.R. | 74/467 |

Primary Examiner—Dirk Wright
Attorney, Agent, or Firm—Oblon, Fisher, Spivak, McClelland & Maier

[57] ABSTRACT

A power transmission for automotive vehicles includes a trans-axle housing formed therein with first, second and third compartments which are in open communication with each other and store therein an amount of lubricating oil, a change-speed gear transmission mounted within the first compartment, a first transfer gear mechanism mounted within the second compartment and in drive connection with the gear transmission, and a second transfer gear mechanism mounted within the third compartment and in drive connection coaxially with the first transfer gear mechanism. For sufficient lubrication of the second transfer gear mechanism, an oil pump is mounted within the first compartment to be driven by the output drive power from the gear transmission and is connected to a communication passage extending to the third compartment through the second compartment to introduce lubricating oil discharged from the oil pump into the third compartment.

5 Claims, 6 Drawing Sheets

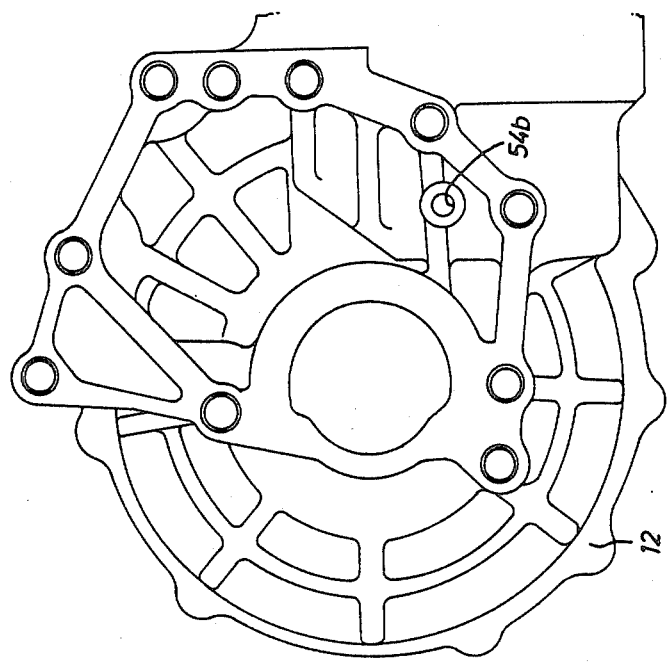
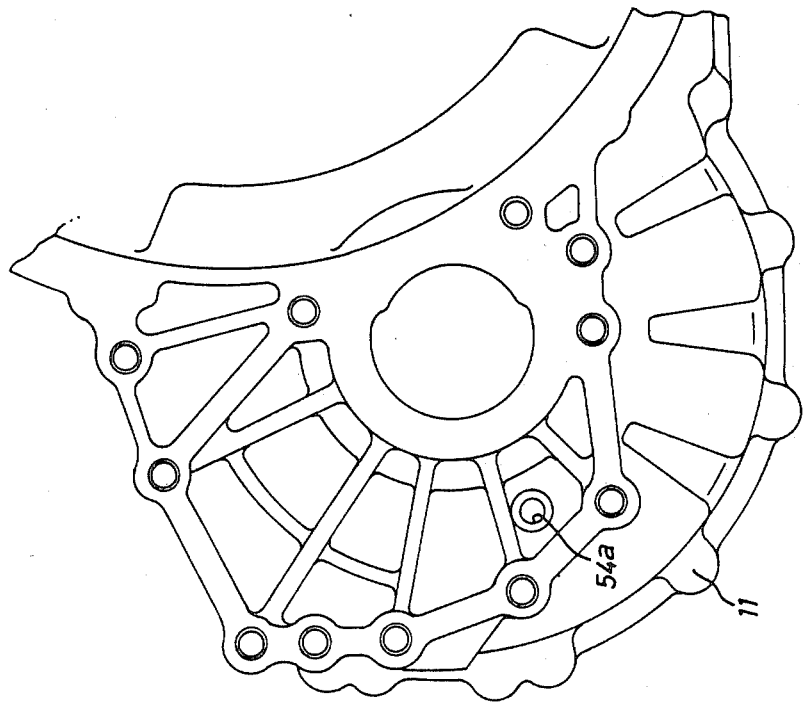

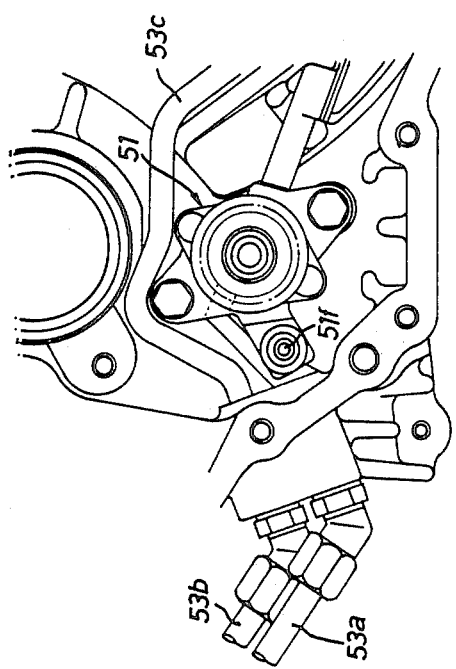
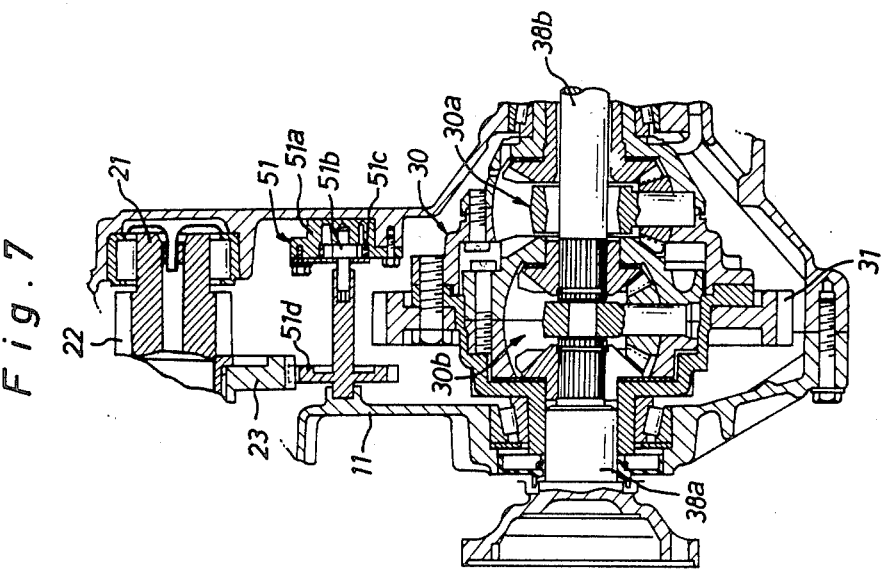

POWER TRANSMISSION FOR AUTOMOTIVE VEHICLE

BACKGROUND OF THE INVENTION

1. Field of the Invention

The present invention relates to a power transmission for automotive vehicles, and more particularly to a power transmission adapted for use in four-wheel drive vehicles.

2. Description of the Background

In Japanese Patent Early Publication No. 59-176120, there has been proposed a power transmission of this kind which comprises a trans-axle housing assembly formed therein with first, second and third compartments in open communication with each other, a change-speed gear transmission mounted within the first compartment to be applied with a drive power from a prime mover of the vehicle, a first transfer gear mechanism mounted within the second compartment to transfer an output drive power from the gear transmission to front wheel and rear wheel drive axles, and a second transfer gear mechanism mounted within the third compartment coaxially with the first transfer gear mechanism to transfer the drive power from the first transfer gear mechanism to the front wheel or rear wheel drive axles. In operation of the power transmission, lubricating oil stored in the comparments is picked up by respective gears of the gear transmission and transfer gear mechanisms and introduced to lubricate intermeshing and sliding portions of the gears.

In such a conventional power transmission as described above, the change-speed gear transmission is greater than the transfer gear mechanisms in the number of gears picking up the lubricating oil in the housing assembly. When the change-speed gear transmission starts to pick up the lubricating oil in operation of the power transmission, the level of lubricating oil in the first compartment gradually drops below the level of lubricating oil in the second and third compartments to cause flow of the lubricating oil into the first compartment from the second and third compartments. This results in insufficient lubrication of the first and second transfer gear mechanisms. If a sufficient amount of lubricating oil is stored in the three compartments to avoid the foregoing problen, there will occur large resistance during rotation of the gears in the gear mechanisms, resulting in loss of the drive power to be transmitted to the front and rear wheel drive alxes.

SUMMARY OF THE INVENTION

It is, therefore, a primary object of the present invention to provide an improved power transmission wherein an oil pump is arranged within the trans-axle housing to supply the lubricating oil from the first compartment into the third compartment and recirculate the supplied lubricating oil into the first compartment through the second compartment for sufficient lubrication of the first and second transfer gear mechanisms without causing any undesired influence acting on the change speed gear transmission.

According to the present invention, there is provided a power transmission for automotive vehicles which comprises a trans-axle housing formed therein with first, second and third compartments which are in open communication with each other and store therein an amount of lubricating oil, a change-speed gear transmission mounted within the first compartment to be applied with a drive power from a prime mover of the vehicle, a first transfer gear mechanism mounted within the second compartment and in drive connection with the gear transmission to transfer therethrough an output drive power from the gear transmission to front and rear wheel drive axles, and a second transfer gear mechanism mounted within the third compartment and in drive connection with the first transfer gear mechanism coaxially therewith to transfer therethrough the output drive power from the first transfer gear mechanism to the front wheel or rear wheel drive axles, wherein an oil pump is mounted within the first compartment of the trans-axle housing to be driven by the output drive power applied thereto from the gear transmission and is connected to a communication passage extending therefrom to the third compartment through the second compartment to introduce lubricating oil discharged from the oil pump into the third compartment for lubrication of the second transfer gear mechanism.

BRIEF DESCRIPTION OF THE DRAWINGS

Additional objects, features and advantage of the present invention will become readily apparent from the following detailed description of preferred embodiments thereof when considered with reference to the accompanying drawings, in which:

FIG. 3 is a partly enlarged right-hand end view of the housing section shown in FIG. 2;

FIG. 4 is a partly enlarged left-hand end view of a housing section taken along line IV—IV in FIG. 1;

FIG. 7 is a cross-sectional view taken along line VII—VII in FIG. 2;

FIG. 8 illustrates a modification of the power transmission; and

DETAILED DESCRIPTION OF THE PREFERRED EMBODIMENTS

Figure 1:
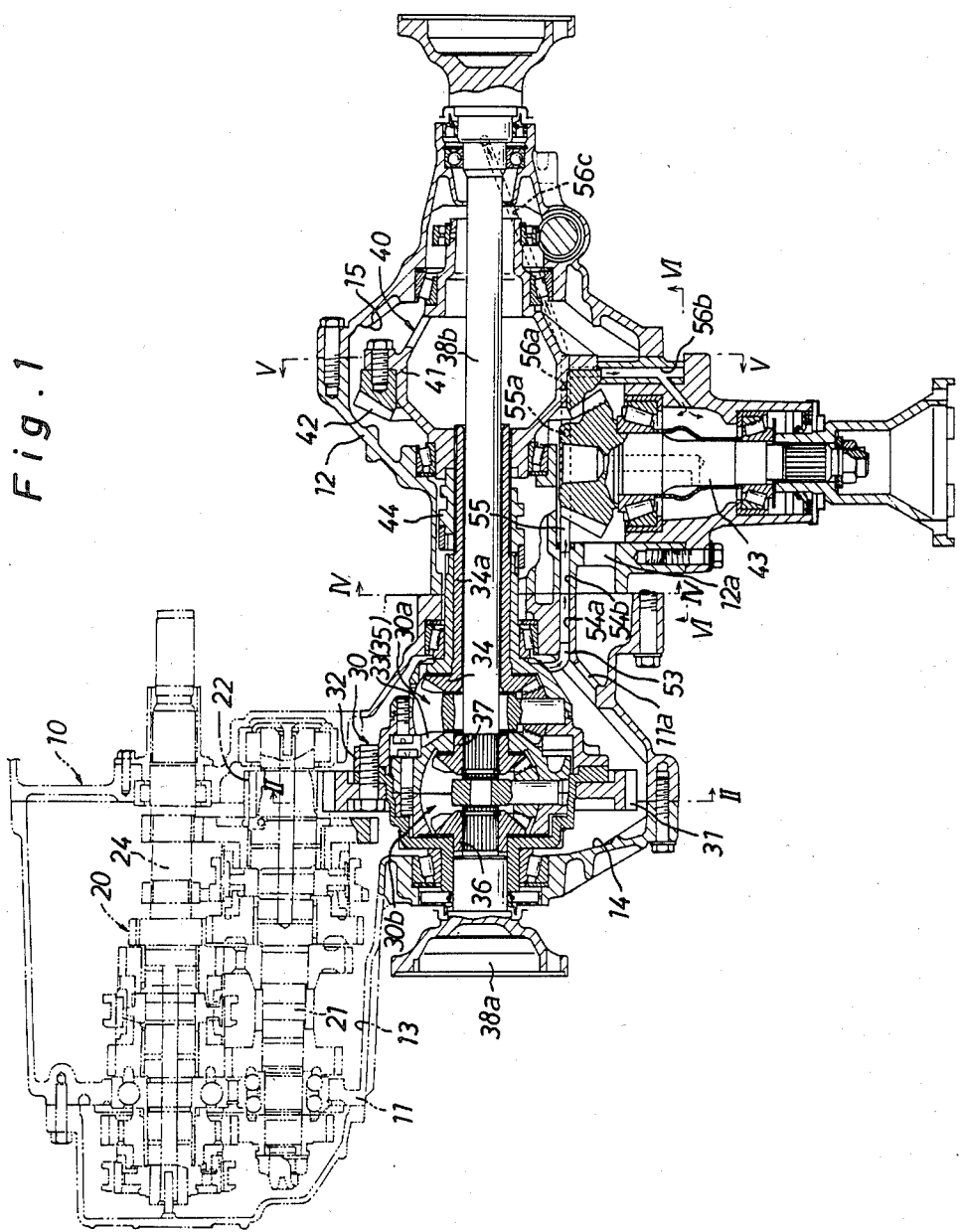
FIG. 1 is a transverse cross-sectional view of a power transmission in accordance with the present invention.

Referring now to the drawings, FIG. 1 illustrates a power transmission adapted for use in four-wheel drive vehicles of the laterally disposed front engine type. The power transmission comprises a trans-axle housing assembly 10 composed of two housing sections 11 and 12, wherein first, second and third compartments 13, 14 and 15 are formed to respectively contain therein a change-speed gear transmission 20, a first transfer gear mechanism 30 in the form of a differential gear unit, and a second transfer gear mechanism 40 in the form of an output gearing for rear wheel drive. The change-speed gear transmission 20 includes an input shaft 24 drivingly connected through a clutch mechanism (not shown) to an output shaft of a prime mover of the vehicle, an output shaft 21 arranged in parallel with the input shaft 24, and a plurality of change-speed gears respectively mounted on the input and output shafts 24, 21.

The first transfer gear mechanism 30 includes a center differential 30a arranged to transfer an output drive power from the change-speed gear transmission 20 to front wheel and rear wheel drive axles, and a front differential 30b integrally assembled with the center differential 30a. The center differential 30a has a casing 32 which is formed to contain therein the front differential 30b. The casing 32 is rotatably mounted within the second compartment 14 of housing section 11 by means of a pair of axially spaced bearings and is integrally provided thereon with a ring gear 31 which is in meshing engagement with an output gear 22 on the output shaft 21 of gear transmission 20. The center differential 30a includes a pair of side gears 33 and 34 rotatably mounted within the casing 32 and meshed with a pinion rotatably carried on the casing 32. The left-hand side gear 33 is integrally formed with a casing 35 of front differential 30b, while the right-hand side gear 34 is integrally formed with a hollow shaft portion 34a which extends through a right-hand cylindrical portion of casing 32 into the interior of the housing section 12.

The front differential 30b is arranged coaxially with the center differential 30a and includes a pair of side gears 36 and 37 assembled within the casing 35 and meshed with a pinion rotatably carried on the casing 35. The left-hand side gear 36 is rotatably supported by a left-hand cylindrical portion of casing 32, while the right-hand side gear 37 is rotatably carried on the casing 35. Both the side gears 36 and 37 are drivingly connected to the inner ends of front wheel drive axles 38a and 38b, respectively. The left-hand front wheel drive axle 38a extends outwardly in a fluid-tight manner from a left-hand side wall of housing section 11 through the casing 32, while the right-hand front wheel drive axle 38b extends into the interior of housing section 12 through the hollow shaft portion 34a of side gear 34 and further extends outwardly in a fluid-tight manner from a right-hand side wall of housing section 12.

The second transfer gear mechanism 40 is arranged coaxially with the differential gear unit 30 to be applied with the output drive power from the gear transmission 20 through the center differential 30a. The second transfer gear mechanism 40 includes a hollow mounting case 41 rotatably supported by a pair of axially spaced bearings carried on the housing section 12, a ring gear 42 fixed to the mounting case 41 for rotation therewith, and a pinion shaft 43 integrally provided with a pinion in meshing engagement with the ring gear 42. The mounting case 41 is in surrounding relationship with the right-hand front wheel drive axle 38b and drivingly coupled with the hollow shaft portion 34a of side gear 34 for rotation therewith. The pinion shaft 43 is arranged in a fore-and-aft direction of the vehicle and rotatably supported by a pair of axially spaced bearings carried on the housing section 12. The pinion shaft 43 extends outwardly in a fluid-tight manner from a rear end wall of the housing section 12 and is drivingly connected in a usual manner to a pair of rear wheel drive axles (not shown) through a propeller shaft and a rear differential (not shown). Arranged between the right-hand cylindrical portion of casing 32 and the hollow mounting case 41 is a coupling sleeve 44 which is axially slidably splined to the hollow shaft portion 34a of side gear 34 for rotation therewith. The coupling sleeve 44 is coupled with a shift fork (not shown) to be shifted toward and away from the right-hand cylindrical portion of casing 32.

In operation of the power transmission, the power from the prime mover is transmitted to the center differential 30a at a selected gear ratio under control of the change-speed gear transmission 20 such that the center differential 30a acts to split the output drive power into two delivery power paths through the side gears 33 and 34 thereof. Thus, the split power from the left-hand side gear 33 is transferred to the front wheel drive axles 38a, 38b through the front differential 30b, while the split power from the right-hand side gear 34 is transferred to the second transfer gear mechanism 40 through the hollow shaft portion 34a of side gear 34. When the coupling sleeve 44 is disengaged from the right-hand cylindrical portion of casing 32 as shown by an upper half in FIG. 1, the center differential 30a is effective to transfer the split power to the second transfer gear mechanism 40 therethrough. When the coupling sleeve 44 is engaged with the right-hand cylindrical portion of casing 32 as shown by a lower half in FIG. 1, the casing 32 is connected to the second transfer gear mechanism 40 through the hollow shaft portion 34a of side gear 34 to cause the center differential 30a ineffective in its differential function.

Figure 5:
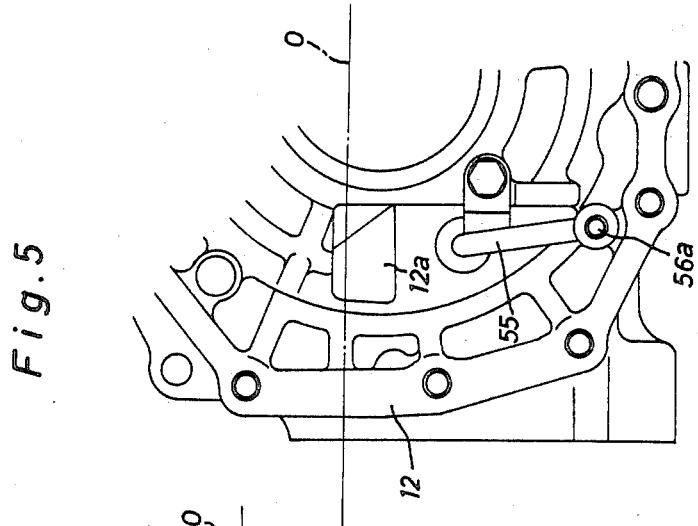
FIG. 5 is a partly enlarged right-hand end view of the housing section taken along line V—V in FIG. 1.
Figure 2:
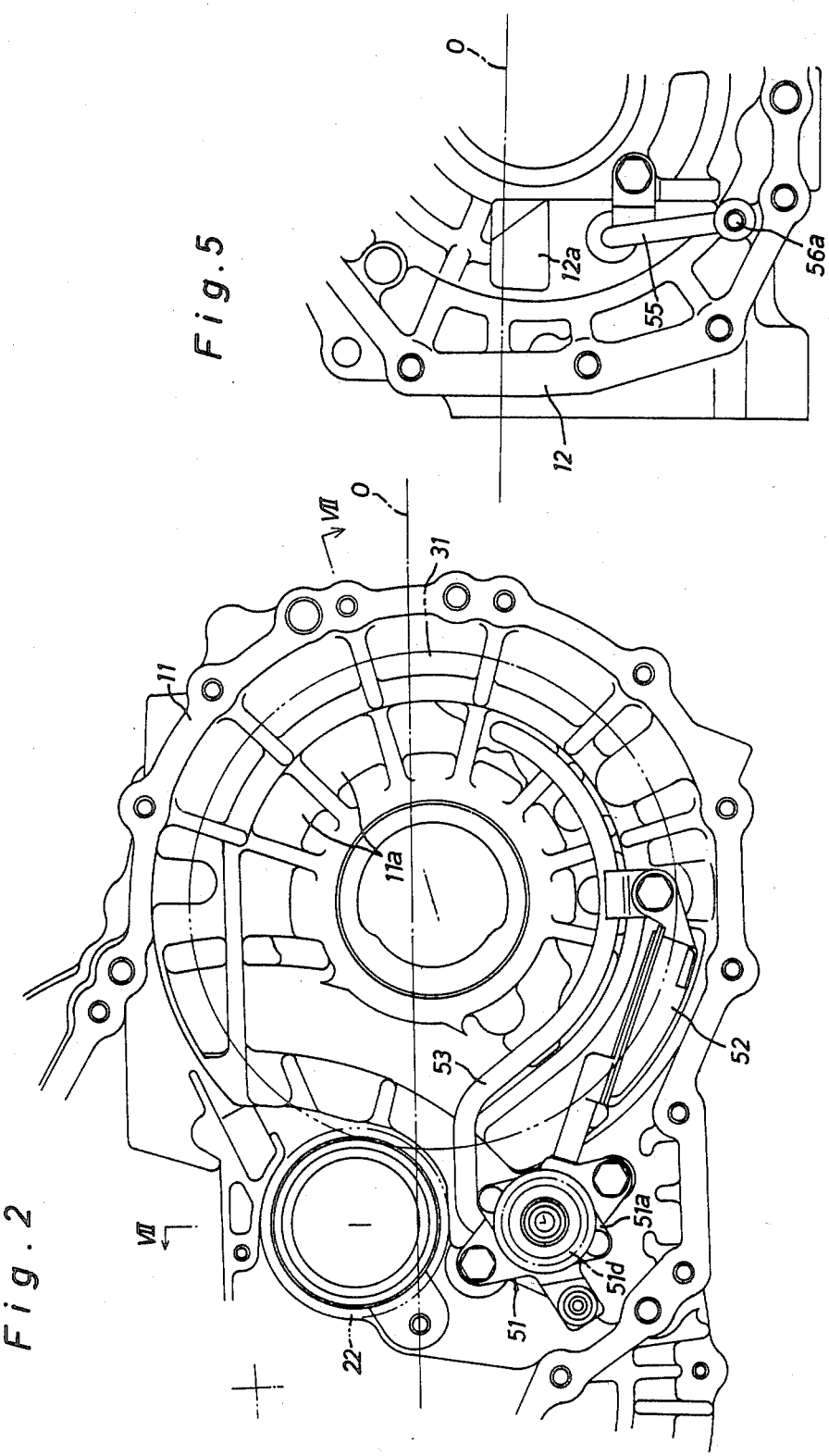
FIG. 2 is a partly enlarged left-hand end view of a housing section taken along line II—II in FIG. 1.
Figure 6:
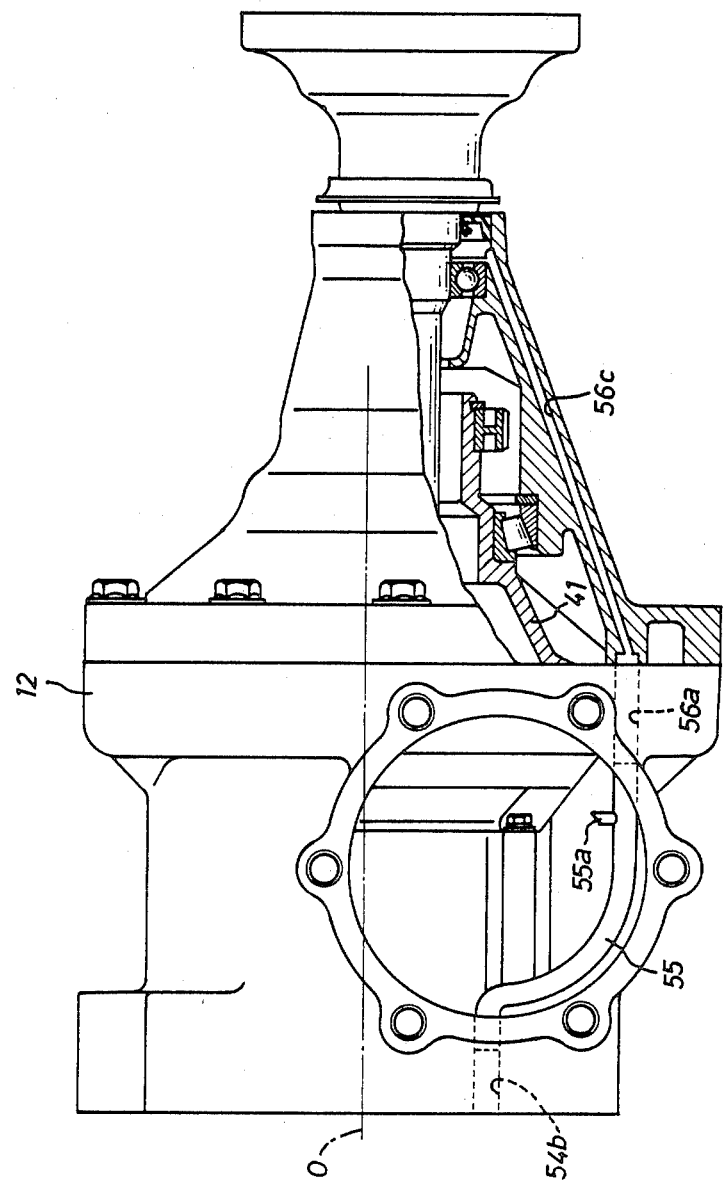
FIG. 6 is an enlarged and partly broken rear end view of the housing section taken along line VI—VI in FIG. 1.

In a practical use of the power transmission, an amount of lubricating oil is stored in the respective compartments 13, 14 and 15 of the housing assembly 10 to be maintained up to a level 0 as shown by a dot-and-dash line respectively in FIGS. 2, 5 and 6. During the operation described above, the lubricating oil in compartments 13, 14 and 15 is picked up respectively by the change-speed gears on input and output shafts 24, 21, of gear transmission 20, the ring gear 31 of differential gear unit 30, and the ring gear 41 of gear mechanism 40 for lubrication of the intermeshing and sliding portions in the respective gear mechanisms 20, 30 and 40. In this embodiment, it is to be noted that as shown in FIGS. 2 and 7, an oil pump 51 such as a trochoid pump is arranged under the output shaft 21 of gear transmission 20 to effect sufficient lubrication of the gear mechanism 40 farthest from the gear transmission 20.

The oil pump 51 comprises a pump casing 51a fixedly mounted on a right-hand internal wall of the housing section 11, a driving rotor 51b rotatably mounted within the pump casing 51a, and a driven rotor 51c arranged in surrounding relationship with the driving rotor 51b within the pump casing 51a. The driving rotor 51b is integrally provided with a shaft which is detachably coupled with a support shaft of a drive gear 51d for rotation therewith. The support shaft of drive gear 51d is rotatably carried on a left-hand internal wall of housing section 11 in such a manner that the drive gear 51d is in meshing engagement with a first-speed driven gear 23 on the output shaft 21 of gear transmission 20. As shown in FIG. 2, the pump casing 51a is formed with an inlet port in connection to an oil strainer 52 arranged at a bottom portion of the second compartment 14 and is formed with an outlet port in connection to an oil tube 53 which is extended through the underside of differential gear unit 30 and connected to an oil passage 54a in the side wall of housing section 11. (see FIGS. 1 and 3) As shown in FIGS. 1, 3 and 4, the oil passage 54a is in communication with an oil passage 54b in the side wall of housing section 12. As shown in FIGS. 1, 5 and 6, an oil tube 55 connected to the oil passage 54b is extended through the underside of an intermeshed portion of ring gear 42 and pinion shaft 43 and is connected to an oil passage 56a in the side wall of housing section 12. The oil tube 55 is provided at an intermediate portion thereof with a jet port 55a which is directed toward the intermeshed portion of ring gear 42 and pinion shaft 43. The oil passage 56a is communicated with the bearing portion of pinion shaft 43 through an oil passage 56b in the side wall of housing section 12 and further communicated with the bearing portion of right-hand front drive axle 38b through an oil passage 56c in the peripheral wall of housing section 12. In addition, the second and third compartments 14 and 15 are communicated with each other through an annular space between the internal wall surfaces of housing sections 11, 12 and the right-hand cylindrical portion of casing 32 and through openings 11a and 12a respectively formed in the side walls of housing sections 11 and 12 and located slightly above each center of the side walls. (see FIGS. 2 and 5)

Assuming that in operation, the first-speed driven gear 23 on output shaft 21 is driven by a first-speed drive gear on input shaft 24, the oil pump 51 is driven by the drive gear 51d in mesh with the driven gear 23 to pump up the lubricating oil from the second compartment 14 through the oil strainer 52 and supply it to the intermeshed portion of ring gear 42 and pinion shaft 43 and both the bearing portions of pinion shaft 43 and front drive axle 38b through oil tubes 53, 55, and oil passages 54a, 54b, 56a, 56b and 56c as shown by arrows in FIG. 1. Subsequently, the supplied lubricating oil flows through the annular space between the internal wall surfaces of housing sections 11, 12 and the right-hand cylindrical portion of casing 32 to recirculate into the second compartment 14. In the event of excessive supply, the lubricating oil flows through the openings 11a and 12a to recirculate into the second compartment 14. This is effective to ensure sufficient lubrication of the gear mechanism 40 and the bearing portions of pinion shaft 43 and front drive axle 38b.

In FIG. 8 there is illustrated a modification of the power transmission, wherein an oil tube 53a is arranged to connect the outlet port of oil pump 51 to the inlet port of an oil cooler (not shown), while an oil tube 53b is arranged to connect the outlet port of the oil cooler to the oil passage 54a through an oil tube 53c. This is effective to restrain rise of temperature of the lubricating oil in operation of the power transmission. In this modification, the oil pump 51 is further provided with a second outlet port 51f for connection to an appropriate portion of the change-speed gear transmission 20.

Figure 9:
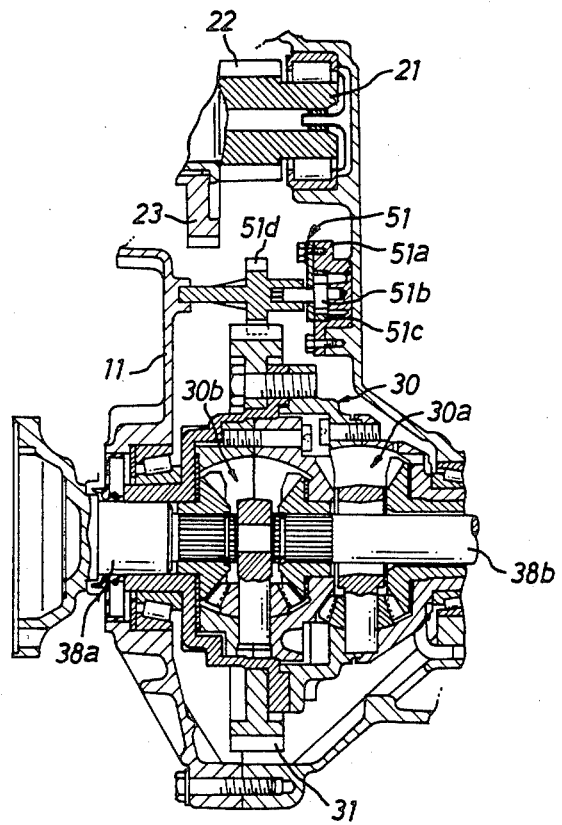
FIG. 9 illustrates another modification of the power transmission.

In FIG. 9 there is illustrated another modification of the power transmission, wherein the drive gear 51d for oil pump 51 is in meshing engagement with the ring gear 31 of the differential gear unit 30. With such arrangement of the drive gear 51d, it is able to drive the oil pump 51 without casing any inertia acting on the change speed gear transmission 20. This is effective to eliminate undesired influence to an operational feel in shifting operation of the gear transmission 20.

Having now fully set forth both structure and operation of preferred embodiments of the concept underlying the present invention, various other embodiments as well as certain variations and modification of the embodiments shown and described herein will obviouly occur to those skilled in the art upon becoming familiar with said underlying concept. It is to be understood, therefore, that within the scope of the appended claims, the invention may be practiced otherwise than as specifically set forth herein.

What is claimed is:

1. A power transmission for automotive vehicles, comprising:
    a trans-axle housing formed therein with first, second and third compartments which are in open communication with each other and store therein an amount of lubricating oil;
    a change-speed gear transmission mounted within said first compartment to be applied with a drive power from a prime mover of the vehicle, and having lubricating means including at least one element picking up said lubricating oil to provide splash lubrication;
    a first transfer gear mechanism mounted within said second compartment and in drive connection with said gear transmission to transfer therethrough an output drive power from said gear transmission to front and rear wheel drive axles, and having lubricating means including at least one element picking up said lubricating oil to provide splash lubrication; and
    a second transfer gear mechanism mounted within said third compartment and in drive connection with said first transfer gear mechanism coaxially therewith to transfer therethrough the output drive power from said first transfer gear mechanism to the front wheel or rear wheel drive axles, and having lubricating means including at least one element picking up said lubricating oil to provide splash lubrication;
    an oil pump mounted within said first compartment of said trans-axle housing and drivingly connected to a driving element of said power transmission for pumping oil from said first compartment; and
    a communication passage extending from said oil pump to said third compartment through said second compartment to introduce lubricating oil discharged from said oil pump into said third compartment for lubricaton of said second transfer gear mechanism.

2. A power transmission as recited in claim 1, wherein said oil pump is arranged to be driven by a change-speed gear of said gear transmission.

3. A power transmission as recited in claim 1, wherein said first transfer gear mechanism includes an input gear in drive connection with an output gear of said change-speed gear transmission, and said oil pump is drivingly connected to said input gear of said first transfer gear mechanism.

4. A power transmission as recited in claim 1, wherein said oil pump comprises means to pump up the lubricating oil from said second compartment.

5. A power transmission as recited in claim 1, wherein said at least one element of said change-speed gear transmission, said first transfer gear mechanism and said second transfer gear mechanism comprise gears.

* * * * *